US010976089B2

(12) United States Patent
Xu et al.

(10) Patent No.: US 10,976,089 B2
(45) Date of Patent: Apr. 13, 2021

(54) METHOD OF CONTROLLING ELECTRONIC EXPANSION VALVE OF AIR-CONDITIONER

(71) Applicant: QINGDAO HAIER AIR CONDITIONER GENERAL CORP., LTD., Qingdao (CN)

(72) Inventors: Wenming Xu, Qingdao (CN); Yu Fu, Qingdao (CN); Mingjie Zhang, Qingdao (CN); Fei Wang, Qingdao (CN); Beibei Xu, Qingdao (CN); Juke Liu, Qingdao (CN); Rongbang Luo, Qingdao (CN); Bo Li, Qingdao (CN); Zhiqiang Ren, Qingdao (CN)

(73) Assignee: QINGDAO HAIER AIR CONDITIONER GENERAL CORP., LTD., Qingdao (CN)

(*) Notice: Subject to any disclaimer, the term of this patent is extended or adjusted under 35 U.S.C. 154(b) by 149 days.

(21) Appl. No.: 16/314,802

(22) PCT Filed: Feb. 9, 2017

(86) PCT No.: PCT/CN2017/073137
§ 371 (c)(1),
(2) Date: Jan. 2, 2019

(87) PCT Pub. No.: WO2018/006595
PCT Pub. Date: Jan. 11, 2018

(65) Prior Publication Data

US 2019/0257563 A1 Aug. 22, 2019

(30) Foreign Application Priority Data

Jul. 4, 2016 (CN) ......................... 201610515042.8

(51) Int. Cl.
*F25B 49/02* (2006.01)
*F25B 41/06* (2006.01)

(52) U.S. Cl.
CPC ............ *F25B 49/02* (2013.01); *F25B 41/062* (2013.01); *F25B 2341/068* (2013.01);
(Continued)

(58) Field of Classification Search
CPC ............ F25B 41/062; F25B 2600/0253; F25B 2600/2513; F25B 2700/21152;
(Continued)

(56) References Cited

U.S. PATENT DOCUMENTS 4,768,348 A * 9/1988 Noguchi ............... F25B 41/062 62/225
2012/0260678 A1* 10/2012 Yoshida ................ F25B 41/062 62/56
(Continued)

FOREIGN PATENT DOCUMENTS

CN 101539151 9/2009
CN 105299974 2/2016
(Continued)

*Primary Examiner* — Kun Kai Ma
(74) *Attorney, Agent, or Firm* — Jiwen Chen; Jacobson Holman PLLC

(57) ABSTRACT

Provided is a control method for an electronic expansion valve in air conditioner comprises: obtaining a real-time running frequency of compressor, a real-time exhaust temperature and a real-time outdoor environment temperature as the compressor running; retrieving a target exhaust temperature according to the real-time running frequency in a preset relation in which each available target exhaust temperature is paired with a single real-time running frequency, wherein the target exhaust temperature retrieved being defined as a first target exhaust temperature; defining a sum of the first target exhaust temperature and a set compensation temperature as a second target exhaust temperature, wherein the set compensation temperature is determined by the real-time outdoor environment temperature; and performing a PID control on opening amount of the electronic expansion valve
(Continued)

based on a deviation that is a difference between the real-time exhaust temperature and the second target exhaust temperature. The method achieves an accurate and stable control on opening amount of electronic expansion valve in air conditioner.

14 Claims, 2 Drawing Sheets

(52) U.S. Cl.
CPC ... *F25B 2500/18* (2013.01); *F25B 2600/0253* (2013.01); *F25B 2600/2513* (2013.01); *F25B 2700/2106* (2013.01); *F25B 2700/21152* (2013.01); *F25B 2700/21172* (2013.01); *F25B 2700/21173* (2013.01); *F25B 2700/21175* (2013.01); *Y02B 30/70* (2013.01)

(58) Field of Classification Search
CPC .... F25B 2700/2106; F25B 2700/21172; F25B 2700/21173; F25B 2700/21175; F25B 2341/068; F25B 2500/18; Y02B 30/72
See application file for complete search history.

(56) References Cited

U.S. PATENT DOCUMENTS

2015/0247660 A1* 9/2015 Nakajima ............... F25B 13/00 62/225
2017/0328621 A1* 11/2017 Nagae ...................... F24F 11/89
2018/0010834 A1* 1/2018 Fujitsuka ................ F25B 49/02
2019/0041099 A1* 2/2019 Kono ...................... F25B 11/00

FOREIGN PATENT DOCUMENTS

CN 105423668 3/2016
JP 201 1027287 2/2011

* cited by examiner

METHOD OF CONTROLLING ELECTRONIC EXPANSION VALVE OF AIR-CONDITIONER

This is a U.S. national stage application of PCT Application No. PCT/CN2017/073137 under 35 U.S.C. 371, filed Feb. 9, 2017 in Chinese, claiming priority of Chinese Application No. 201610515042.8, filed Jul. 4, 2016, all of which are hereby incorporated by reference.

The present invention belongs to the technical field of heating ventilation air conditioning. In particular, the invention relates to the control of an air conditioner, more specifically, is a control method for an electronic expansion valve in air conditioner.

Background of Technology

An electronic expansion valve is a kind of new control element commonly used in refrigerant circulation system of air conditioner. An electronic expansion valve opening is controlled to regulate the amount of refrigerant circulating in air conditioning system in order to meet the performance demand. Hence, the control of electronic expansion valve is critical for evaluating the energy efficiency ratio of the air conditioning system.

A PID is an eligibly control technique for the opening of electronic expansion valve. To be specific, the control action can be calculated by means of the PID algorithm on the basis of the deviation, which is the difference between the actual output temperature and the desired output temperature of the compressor in air conditioning system. In this way, the opening amount of the expansion valve could be adapted to a desired degree rapidly, thereby improving its performance in response to the changes of the outside.

In a typical PID controller designed for the electronic expansion valve of the prior art, the desired output temperature of the compressor is determined only by the frequency of the compressor. However, the variation of the real-time outdoor environment temperature could cause a deviation on obtaining the desired output temperature, further resulting in an inaccurate calculated opening amount of the electronic expansion valve, further exerting negative effect on the energy efficiency ratio of the air conditioning system. Additionally, the constant of the typical PID controller is unchanged in controlling the opening amount of the electronic expansion valve, which undermines the control performance in response to the variation of operating condition or to different types of air conditioners. It would be too difficult to achieve an ideal air conditioning refrigerant circulation system energy efficiency ratio relying on the inaccurate electronic expansion valve opening amount.

An aspect of the present invention is to provide a control method for an electronic expansion valve in air conditioner, in which the desired output temperature of the compressor varies in response to the change of the real-time outdoor environment temperature. Therefore, the control of the electronic expansion valve could be more accurate and reliable and the energy efficiency ratio of the air conditioning refrigerant circulation system could be improved.

SUMMARY OF THE INVENTION

In order to achieve the above object, the present invention is implemented by the following technical solutions:

A control method for an electronic expansion valve in air conditioner comprises:

obtaining a real-time running frequency , a real-time exhaust temperature and a real-time outdoor environment temperature as compressor running; retrieving a target exhaust temperature according to the real-time running frequency in a preset relation in which each target exhaust temperature is paired with a single real-time running frequency and defining as a first target exhaust temperature;

defining a sum of the first target exhaust temperature and a set compensation temperature as a second target exhaust temperature, wherein the set compensation temperature is determined by the real-time outdoor environment temperature ; and performing a PID control on opening amount of the electronic expansion valve based on a deviation that is a difference between the real-time exhaust temperature and the second target exhaust temperature .

The method as described above, after obtaining the real-time running frequency, the real-time exhaust temperature and the real-time outdoor environment temperature , before performing a PID control, the method further includes:

Comparing the real-time running frequency with a first set frequency;

if the real-time running frequency is greater than or equal to the first set frequency, obtaining an integral coefficient according to a first set rule; if the real-time running frequency is less than the first set frequency, performing a process comprising:

in cooling mode, comparing the real-time outdoor environment temperature with a first set outdoor environment temperature; if the real-time outdoor environment temperature is less than the first set outdoor environment temperature, obtaining an integral coefficient according to a first set basic integral coefficient and a second set rule; if the real-time outdoor environment temperature is greater than or equal to the first set outdoor environment temperature, obtaining an integral coefficient according to a second set basic integral coefficient and the second set rule; wherein the integral coefficient of the PID algorithm obtained according to the first set rule is greater than or equal to the integral coefficient of the PID obtained according to the second set rule and the first set basic integral coefficient is greater than the second set basic integral coefficient;

in heating mode, comparing the real-time outdoor environment temperature with a second set outdoor environment temperature; if the real-time outdoor environment temperature is greater than the second set outdoor environment temperature, obtaining an integral coefficient according to a third set basic integral coefficient and a third set rule; if the real-time outdoor environment temperature is less than or equal to the second set outdoor environment temperature, obtaining an integral coefficient according to a fourth set basic integral coefficient and a third set rule; wherein the integral coefficient of the PID algorithm obtained according to the first set rule is greater than or equal to the integral coefficient of the PID obtained according to the third set rule and the third set basic integral coefficient is greater than the fourth set basic integral coefficient.

Then performing a PID control by means of the deviation that is a difference of the real-time exhaust temperature and the set target exhaust temperature on the opening amount of the electronic expansion valve; the integral coefficient of the PID algorithm of the PID control is obtained according to a first set rule, a second set rule or a third set rule.

Compared with the prior art, the advantages and positive effects of the present invention are:

1. In the PID control method on electronic expansion valve opening amount as described above, the target exhaust temperature is not only determined by the real-time running frequency, but also depends on a compensation by the set compensation temperature determined by the real-time outdoor environment temperature, that means the target exhaust temperature calculated could be more precise, and close to the actual ambient, therefore the PID control on electronic expansion valve opening amount could be more accurate and careful, and the energy efficiency ratio could be improved.

2. In the process as described above to control the electronic expansion valve opening amount, as the real-time compressor running frequency is less than the first set frequency, namely the compressor works at the low-frequency state, a comparatively smaller integral coefficient is selected in the PID algorithm, which limited adjustment in a small range as the compressor working in the low-frequency state so as to reduce potential fluctuation of the exhaust temperature or oscillation of adjusted valve opening amount; as the real-time compressor running frequency is equal to or greater than the first set frequency, namely the compressor works at the non-low-frequency state, a comparatively larger integral coefficient is selected in the PID algorithm, which allows the adjustment within a flexible wide range so as to improve response speed. Those refinements improve the accuracy and reliability of the control on the electronic expansion valve opening amount, which is advantageous to optimizing the energy efficiency ratio of the air conditioning refrigerant circulation. Moreover, in the embodiment shown in FIG. 2, the integral coefficient varies with respect to different outdoor environment temperature as the compressor working at the low-frequency state, that solution could reduce potential fluctuation of the exhaust temperature or oscillation of opening amount caused by the worsen outdoor environment. The comprehensive consideration of operating parameters of compressor and outdoor environment condition makes the control method more widely available.

Other features and advantages of the present invention will become apparent referred to the detailed description

BRIEF DESCRIPTIONS OF THE DRAWINGS

DETAILED DESCRIPTION OF THE INVENTION

Figure 1:
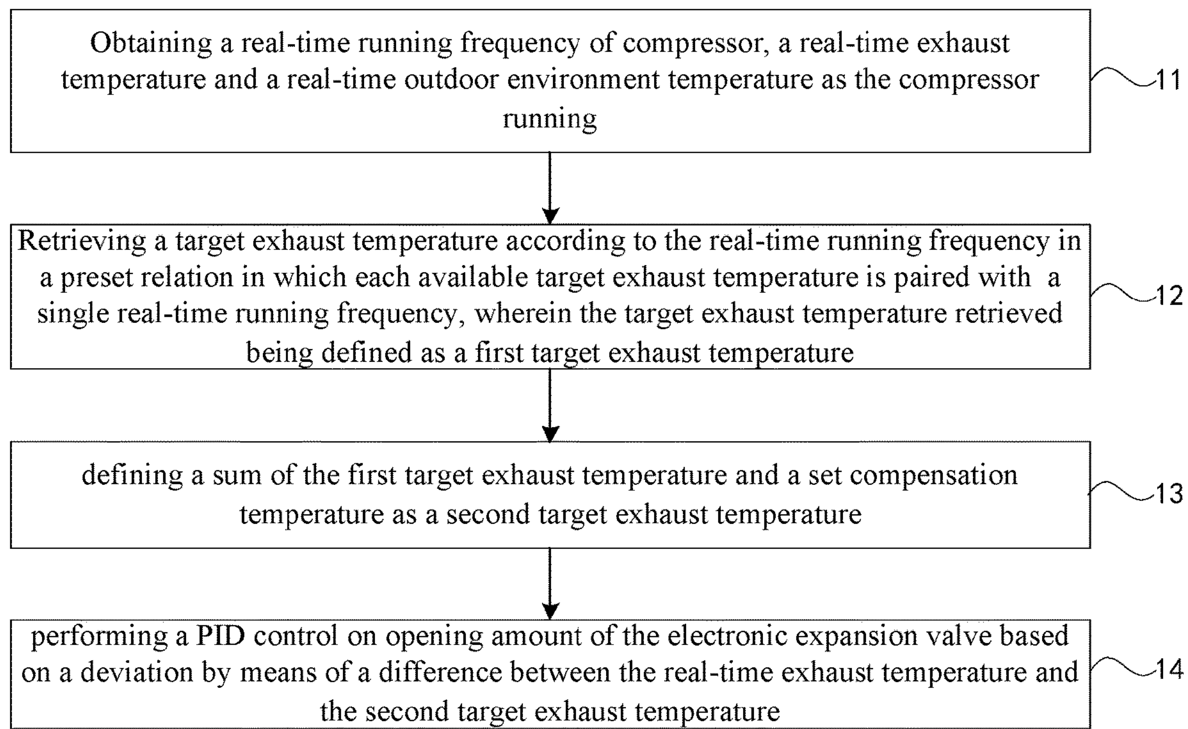
FIG. 1 is a flow chart of a control method on electronic expansion valve in air conditioner according to one embodiment of the present invention.

For the purpose of promoting and understanding of the principles of the invention, reference will now be made to the embodiment illustrated in the drawings and specific language will be used to describe the same.

Shown in FIG. 1 is a flow chart of a control method on electronic expansion valve in air conditioner according to one embodiment of the present invention. To be specific, FIG. 1 is a flow chart showing one control implementation of opening amount of an electronic expansion valve in air conditioning refrigerant circulation.

The control method on electronic expansion valve in air conditioner shown in FIG. 1 comprises the following steps.

Step 11: obtaining a real-time running frequency, a real-time exhaust temperature and a real-time outdoor environment temperature as compressor running.

In Step 11, the real-time running frequency indicates a sampled real-time speed frequency obtained as the compressor running based on a preset sampling rate. It is easy to read out the real-time speed frequency by a controller installed in the air conditioner because the controller is also used for driving the compressor; the real-time exhaust temperature indicates a sampled real-time exhaust temperature of the compressor obtained based on a preset sampling rate as the compressor running, which could be collected by a temperature sensor at the output of the compressor and read out by the controller; the real-time outdoor environment temperature indicates a sampled temperature of the ambient surrounding the compressor obtained based on a preset sampling rate, which could be collected by a temperature sensor on the outdoor unit of the air conditioner and read out by the air conditioner controller.

Step 12: retrieving a target exhaust temperature according to the real-time running frequency in a preset relation in which each available target exhaust temperature is paired with a single real-time running frequency, wherein the target exhaust temperature retrieved being defined as a first target exhaust temperature.

The preset relation that associates each target exhaust temperature to a single real-time running frequency is previously prepared and stored in the air conditioner controller before the air conditioner leaving factory, which is obtained by researchers or professionals in the field of air conditioning with specific designed tests and could be modified by authorization. The relation could be modified by authorization. For example, the preset relation could be a look-up data table prepared and stored in advance in which each target exhaust temperature is paired with a single frequency interval. A target exhaust temperature with respect to the real-time running frequency obtained in Step 11 could be determined by the look-up table method. Preferably, the target exhaust temperature and the real-time running frequency are in a linear relation that satisfies the equation: $T_d$=k*f+n, wherein $T_d$ represents the target exhaust temperature and f represents the real-running frequency, and the parameters “k” and “n” are known constants which are stored in advance. The target exhaust temperature $T_d$ could be calculated by the linear function. The target exhaust temperature calculated could be helpful in achieving the maximum of energy efficiency ratio. The target exhaust temperature determined by the real-time running frequency is regarded as the first target exhaust temperature.

Step 13: Defining a sum of the first target exhaust temperature and a set compensation temperature as a second target exhaust temperature.

In Step 13, the set compensation temperature is an available temperature prepared and stored in the air conditioner controller in advance before the air conditioner leaving factory, which is obtained by researchers or professionals in the field of air conditioning with specific designed tests and could be modified by authorization. The set compensation temperature relates to the real-time outdoor environment temperature and is determined according to the real-time outdoor environment temperature.

The second target exhaust temperature could be obtained by calculating the sum of the first target exhaust temperature obtained in Step 12 and the set compensation temperature.

Step 14: performing a PID control on the opening amount of the electronic expansion valve based on a deviation that is a difference between the real-time exhaust temperature and the second target exhaust temperature.

In the PID control method on electronic expansion valve opening amount as described above, the target exhaust temperature is not only determined by the real-time running frequency, but also depends on a compensation by the set compensation temperature determined by the real-time outdoor environment temperature, that means the target exhaust temperature calculated could be more precise, and close to the actual ambient, therefore the PID control on electronic expansion valve opening amount could be more accurate and careful, and the energy efficiency ratio could be improved.

Preferably, the set compensation temperature could be obtained through the following steps: comparing the real-time outdoor environment temperature with boundaries of preset outdoor temperature ranges to determine the one outdoor temperature range that the real-time outdoor environment temperature belonging to; retrieving a compensation temperature according to the determined outdoor temperature range in a set of available compensation temperatures which are paired with outdoor temperature ranges; reading out the compensation temperature retrieved and using the value as the set compensation temperature, wherein the compensation temperature could be positive, negative or zero.

The described process for obtaining the set compensation temperature makes it possible to deal with a comparatively small volume of data and further simplifies the control procedures, which is advantageous for enabling the control more efficient and responsive.

But there is one problem with that, if the real-time outdoor environment temperature just at or close to critical points of any outdoor temperature range, the second target exhaust temperature has a tendency to oscillate, leading to fluctuations of the exhaust temperature of the compressor, which decreases the accuracy and reliability of the control on electronic expansion valve opening amount. In order to solve the problem, as a more preferred embodiment, the following procedures are introduced after obtaining the second target exhaust temperature, namely the sum of the first target exhaust temperature and the set compensation temperature obtained in Step 13, which comprises:

Determining whether or not of the second target exhaust temperature is changed; specifically, comparing two adjacent second target exhaust temperatures collected within two consecutive sampling intervals to determine whether or not the second target exhaust temperatures is changed.

Performing Step 14 if the second target exhaust temperature is not changed, what that is to perform a PID control on the electronic expansion valve opening amount by means of the deviation that is a difference between the real-time exhaust temperature and the second target exhaust temperature.

If the second target exhaust temperature is changed, performing Step 14 and starting a timer as soon as the second target exhaust temperature is determined changed. The timer will be restarted as soon as the second target exhaust temperature are determined changed again; the restart means the timer is cleared as the second target exhaust temperature is determined changed again and then it could be refereed as a complete timing period. A new circulation starts at the point when the second target exhaust temperature is determined changed again. Within one timing period, if the measured time does not reach to a set time, the set compensation temperature stays the same even during which the compensation temperature with respect to the real-time outdoor environment temperature should be adjusted, the set compensation temperature is fixed in Step 13. However within one timing period since the measured time reaching to a set time until the restart of the timer, it is necessary to determine whether or not the real-time outdoor environment temperature is changed by comparing with the original value sampled at the start point. If the real-time outdoor environment temperature varies, refreshing the set compensation temperature according to the varied real-time outdoor environment temperature; if the real-time outdoor environment temperature remaining the same, maintaining the set compensation temperature unchanged.

For example, if the real-time outdoor environment temperature varies before the measured time reaching to the set time within a timing period and then restores to the original temperature as the measured time reaching to the set time, the situation could be defined as that the real-time outdoor environment temperature is unchanged in the interval from the measured time reaching to the set time to the restart of the timer, the set compensation temperature stays the same. If the real-time outdoor environment temperature varies before the measured time reaching to the set time comparing with the original temperature sampled as the timer starts to work and maintains the variation, the set compensation temperature only could be adjusted until the measured time reaching to the set time, before that time the set compensation temperature should be maintained unchanged. If the real-time outdoor environment temperature is unchanged before the measured time reaching to a set time but varies during the interval from the measured time reaching to the set time to the restart of the timer, the adjustment of the set compensation temperature depends on whether or not the real-time outdoor environment temperature is changed. The set time is a constant stored in the air conditioner controller which could be modified by authorization. For example, the set time could be set as 20 minutes. By means of providing the retention by the set time for the set compensation temperature, the fluctuation of the second target exhaust temperature caused by the oscillation of the sampled real-time outdoor environment temperature at the critical points reduces.

Figure 2:
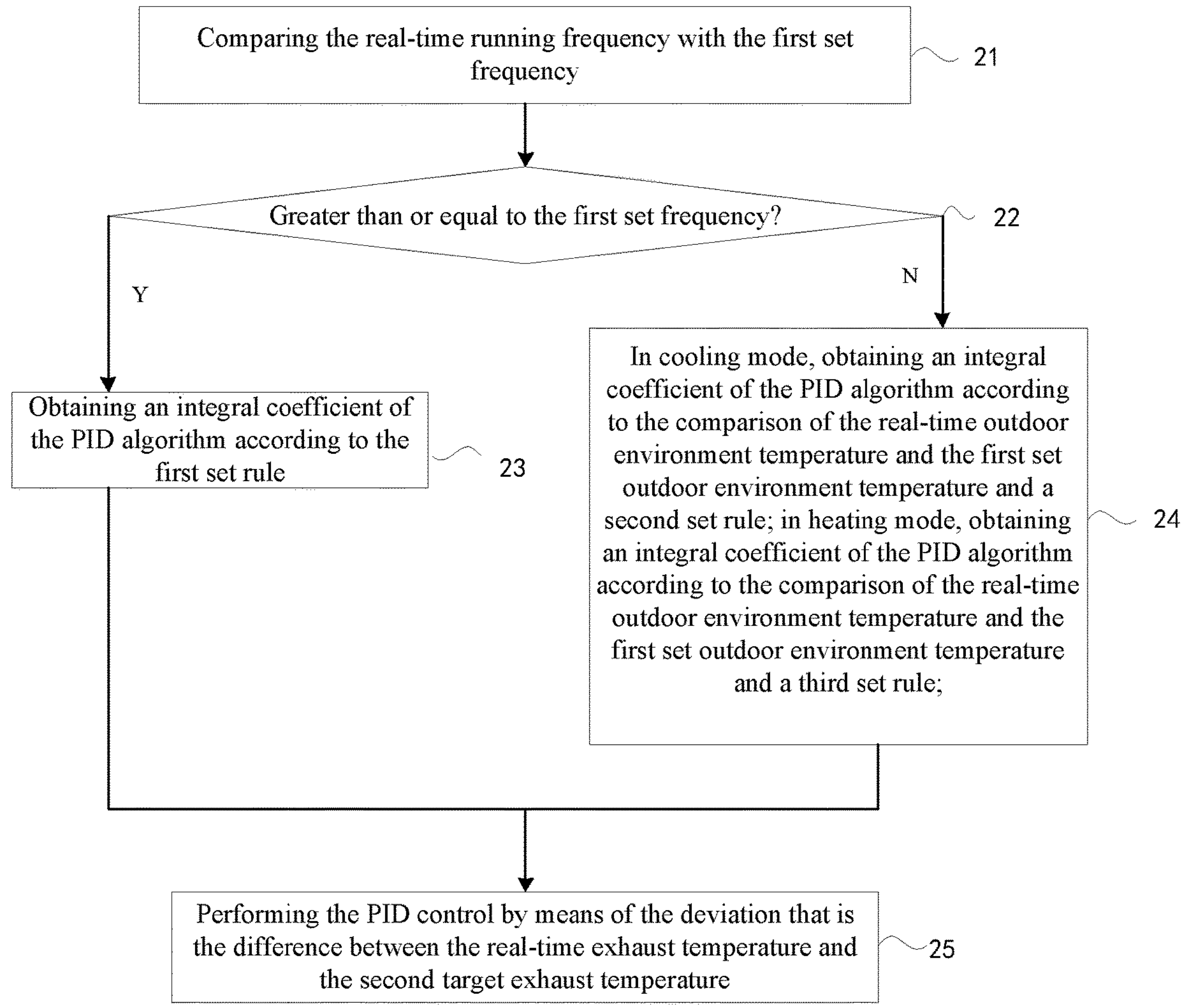
FIG. 2 is a partial flow chart of a control method on electronic expansion valve in air conditioner according to another embodiment of the present invention.

FIG. 2 is a partial flow chart showing another embodiment of the control method on electronic expansion valve opening amount, specifically relating to procedures after obtaining the real-time running frequency, the real-time exhaust temperature and the real-time outdoor environment temperature.

As shown in FIG. 2, after obtaining the real-time running frequency, the real-time exhaust temperature and the real-time outdoor environment temperature, in addition to performing those procedures to determine the second target exhaust temperature as shown in FIG. 1, the method further comprises the following steps to determine coefficients variables of the PID algorithm in the PID control.

Step 21: Comparing the real-time running frequency with a first set frequency.

To be specific, the step 21 includes: comparing the obtained real-time running frequency with the first set frequency, wherein the first set frequency is a constant frequency value stored in the air conditioner controller in advance and could be modified by authorization. The first set frequency represents a boundary to separate a low-frequency state from a non-low-frequency state of the compressor as running. Preferably, the first set frequency is in the range from 30 to 40 Hz and could vary with respect to different capacities of air conditioner or with respect to specific cooling or heating working modes, in general the higher air conditioner capacity, the lower the first set frequency, and vice versa.

Step 22: Determining whether the real-time running frequency is equal to or greater than the first set frequency; if the real-time running frequency is equal to or greater than the first set frequency, performing Step 23, if the real-time running frequency is less than the first set frequency, performing Step 24.

Step 23: If in Step 22 it is determined that the real-time running frequency is equal to or greater than the first set frequency, the compressor is regarded as working at the non-low-frequency state. An integral coefficient of the PID algorithm is obtained according to a first set rule, and then performing Step 25.

Step 24: If in Step 22 it is determined that the real-time running frequency is less than the first set frequency, the compressor is regarded as working at the low-frequency state. If the air conditioner works at the cooling mode, an integral coefficient of the PID algorithm is obtained according to the result of the comparison of the real-time outdoor environment temperature and a first set outdoor environment temperature and a second set rule. But if the air conditioner works at the heating mode, an integral coefficient of the PID algorithm is obtained according to the result of the comparison of the real-time outdoor environment temperature and a first set outdoor environment temperature and a third set rule. Then, Step 25 is being performed.

To be specific, in cooling mode, if the compressor works at the low-frequency state, comparing the real-time outdoor environment temperature with the first set outdoor environment temperature, if the real-time outdoor environment temperature is less than the first outdoor environment temperature, an integral coefficient of the PID algorithm is obtained according to a first set basic integral coefficient and the second set rule; if the real-time outdoor environment temperature is equal to or greater than the first set outdoor environment temperature, an integral coefficient of the PID algorithm is obtained according to a second set basic integral coefficient and the second set rule; wherein the first set outdoor environment temperature is a constant outdoor environment temperature stored in advance and could be modified by authorization. The first set outdoor environment temperature represents a boundary separating a high-temperature outdoor environment condition from a non-high-temperature outdoor environment condition in cooling mode; for example, the first set outdoor environment temperature could be set as 38° C. The first set basic integral coefficient, the second set basic integral coefficient, and the second set rule are also fixed and stored in advance in the air conditioner controller and those parameters could also be modified by authorization.

Further the integral coefficient of the PID algorithm obtained according to the first set rule in Step 23 is greater than or equal to the integral coefficient of the PID algorithm obtained according to the second set rule in Step 24; and the first set basic integral coefficient is greater than the second set basic integral coefficient. To be specific, regardless of whether the real-time outdoor environment temperature is less than the first set outdoor environment temperature, if the compressor works at a high-frequency state, the integral coefficient of the PID algorithm obtained according to the first set rule is greater than or equal to the integral coefficient of the PID algorithm obtained according to the second set rule as the compressor working at the low-frequency state. If the real-time outdoor environment temperature is less than the first set outdoor environment temperature as the compressor working at the low-frequency state, it describes the outdoor ambient is the non-high-temperature outdoor environment condition. In this condition, the first set basic integral coefficient which is used to calculate the integral coefficient of the PID algorithm is greater than the second set basic integral coefficient which is used to calculate the integral coefficient of the PID algorithm under the high-temperature outdoor environment condition that the real-time outdoor environment temperature is greater than or equal to the first set outdoor environment temperature.

In heating mode, if the compressor working at the low-frequency state, comparing the real-time outdoor environment temperature with a second set outdoor environment temperature; if the real-time outdoor environment temperature is greater than the second set outdoor environment temperature, an integral coefficient of the PID algorithm is obtained according to a third set basic integral coefficient and a third set rule; if the real-time outdoor environment temperature is equal to or less than the second set outdoor environment temperature, an integral coefficient of the PID algorithm is obtained according to a fourth set basic integral coefficient and the third set rule; wherein the second set outdoor environment temperature is an outdoor environment temperature value stored in advance and could be modified by authorization. The second set outdoor environment temperature represents a boundary separating a low-temperature outdoor environment condition or a non-low-temperature outdoor environment condition in heating mode; for example, the second set outdoor environment temperature could be set as 10 ° C. The second set rule could see the description as above. The third set basic integral coefficient and the fourth set basic integral coefficient are also fixed and stored in advance in the air conditioner controller and those parameters could also be modified by authorization.

Further the integral coefficient of the PID algorithm obtained according to the first set rule in Step 23 is greater than or equal to the integral coefficient of PID algorithm obtained according to the third set rule in Step 24, and the third set basic integral coefficient is greater than the fourth set basic integral coefficient. Specifically, regardless of whether or not the real-time outdoor environment temperature is greater than the second set outdoor environment temperature, if the compressor works at the high-frequency state, the integral coefficient of the PID algorithm obtained according to the first set rule is greater than or equal to the integral coefficient of PID algorithm obtained according to the third set rule as the compressor working at the low-frequency state. As the compressor working at the low-frequency state, if the real-time outdoor environment temperature is greater than the second set outdoor environment temperature, it describes the outdoor ambient is the non-low-temperature outdoor environment condition. In this condition, the third set basic integral coefficient which is used to calculate the integral coefficient of the PID algorithm is greater than the fourth set basic integral coefficient which is used to calculate the integral coefficient of the PID algorithm under the low-temperature outdoor environment condition that the real-time outdoor environment temperature is less than the second set outdoor environment temperature.

Step 25: The PID control is performed on the electronic expansion valve opening amount by means of a deviation that is a difference between the real-time exhaust temperature and the second target exhaust temperature.

The Step 25 results from the Step 23 or the Step 24; to be specific, after obtaining the integral coefficient of the PID algorithm with respect to the real-time compressor running frequency according to the first set rule in the Step 23 or according to the second set rule or the third set rule in the Step 24, assigning the obtained integral coefficient to the PID algorithm and performing the PID control on the electronic expansion valve. The PID control is based on the deviation that is the difference between the real-time exhaust temperature and the second target exhaust temperature, wherein the embodiment shown in the FIG. 1 could be referred to for determining the second target exhaust temperature.

In the process as described above to control the electronic expansion valve opening amount, as the real-time compressor running frequency is less than the first set frequency, namely the compressor works at the low-frequency state, a comparatively smaller integral coefficient is selected in the PID algorithm, which limited adjustment in a small range as the compressor working in the low-frequency state so as to reduce potential fluctuation of the exhaust temperature or oscillation of adjusted valve opening amount; as the real-time compressor running frequency is equal to or greater than the first set frequency, namely the compressor works at the non-low-frequency state, a comparatively larger integral coefficient is selected in the PID algorithm, which allows the adjustment within a flexible wide range so as to improve response speed. Those refinements improve the accuracy and reliability of the control on the electronic expansion valve opening amount, which is advantageous to optimizing the energy efficiency ratio of the air conditioning refrigerant circulation. Moreover, in the embodiment shown in FIG. 2, the integral coefficient varies with respect to different outdoor environment temperature as the compressor working at the low-frequency state, that solution could reduce potential fluctuation of the exhaust temperature or oscillation of opening amount caused by the worsen outdoor environment. The comprehensive consideration of operating parameters of compressor and outdoor environment condition makes the control method more widely available.

As a preferred implementation, the first set rule in Step 23 is: the integral coefficient is a fifth set integral coefficient. With the first set rule, procedures for obtaining the integral coefficient comprises: assigning the fifth set integral coefficient into the integral coefficient variable of the PID algorithm, that is to say, if the real-time running frequency is greater than or equal to the first set frequency, the integral coefficient of the PID algorithm is a fixed value. That simple design for the PID controller could achieve a much greater effect.

After obtaining the integral coefficient in Step 23, assigning a differential coefficient variable of the PID algorithm in Step 25; there is no limit to the value of the differential coefficient, it could be fixed. But the assignment of a proportional coefficient variable in the PID algorithm is preferable determined on the basis of the integral coefficient obtained. In order to improve the stability on the control of the electric expansion valve opening amount, as a preferred embodiment, procedures after obtaining the integral coefficient of the PID algorithm according to the first set rule in Step 23 further include: based on a first corresponding relation in which available proportional coefficients are paired with integral coefficients, obtaining a proportional coefficient with respect to the integral coefficient of the PID algorithm obtained according to the first set rule. In this way, the proportional coefficient obtained in Step 25 is a value paired with the integral coefficient acquired according to the first set rule and results from the first corresponding relation in which proportional coefficients associate to integral coefficients. More preferably, if the integral coefficient is the fifth set integral coefficient, the proportional coefficient is a first set proportional coefficient which is also a fixed value.

In Step 24, the second set rule as the air conditioner working in cooling mode preferably includes the following steps:

If the real-time outdoor environment temperature is less than the first set outdoor environment temperature and the real-time running frequency is less than a second set frequency, the integral coefficient is the first set basic integral coefficient;

If the real-time outdoor environment temperature is less than the first set outdoor environment temperature and the real-time running frequency is greater than or equal to a second set frequency, the integral coefficient $k_i$ satisfies $k_i$=(f−the second set frequency)*2+the first set basic integral coefficient;

If the real-time outdoor environment temperature is equal to or greater than the first set outdoor environment temperature and the real-time running frequency is less than the second set frequency, the integral coefficient is the second set basic integral coefficient;

As the real-time outdoor environment temperature is equal to or greater than the first set outdoor environment temperature and the real-time running frequency is equal to or greater than the second set frequency, the integral coefficient $k_i$ satisfies $k_i$=(f−the second set frequency)*2+the second set basic integral coefficient;

wherein, the second set frequency is less than the first set frequency, and f represents the real-time running frequency.

As the air conditioner working in the cooling mode, further determination is performed by using the second set frequency which is less than the first set frequency, so as to form a frequency buffer range formed by the first set frequency and the second set frequency which is used to determine the real-time compressor running frequency. In the frequency buffer range, the integral coefficient is obtained from the linear relations $k_i$=(f−the second set frequency)*2+the first set basic integral coefficient or $k_i$=(f−the second set frequency)*2+the second set basic integral coefficient, which could avoid the fluctuation of the electronic expansion valve opening amount caused by a sudden change of the integral coefficient as the working state of the compressor converting from the low-frequency state to the non-low-frequency state.

Moreover, as described above, the integral coefficient of the PID algorithm acquired according to the first set rule in Step 23 is greater than or equal to the integral coefficient of the PID algorithm acquired according to the second set rule in Step 24. Therefore, both of the first set basic integral coefficient and the second set basic integral coefficient are less than the fifth set integral coefficient and the maximum of the integral coefficient calculated by the linear formulas $k_i$=(f−the second set frequency)*2+the first set basic integral coefficient or $k_i$=(f−the second set frequency)*2+the second set basic integral coefficient is the fifth set integral coefficient, that is to say the integral coefficient calculated by the linear formulas is not allowed to be greater than the fifth set integral coefficient. For example, if the integral coefficient $k_i$ calculated according to either of the above formulas is less than the fifth set integral coefficient, $k_i$ is assigned as the calculated value by the formula; and if the integral coefficient $k_i$ calculated according to either of the above formulas is greater than or equal to the fifth set integral coefficient, $k_i$ is assigned the fifth set integral coefficient.

In cooling mode, after obtaining the integral coefficient in Step 24, assigning a differential coefficient variable of the PID algorithm in Step 25; there is no limit to the differential coefficient, it could be fixed. But the assignment of a proportional coefficient variable in the PID algorithm is preferable determined on the basis of the integral coefficient obtained. In order to improve the stability on the control of the electric expansion valve opening amount, as a preferred embodiment, procedures after obtaining the integral coefficient of the PID algorithm according to the first set rule in Step 24 further include: based on a second corresponding relation in which available proportional coefficients are paired with integral coefficients, obtaining a proportional coefficient with respect to the integral coefficient of the PID algorithm obtained according to the second set rule. In this way, the proportional coefficient obtained in Step 25 is a value paired with the integral coefficient acquired according to the first set rule in Step 24 and results from the second corresponding relation in which proportional coefficients associate to integral coefficients. More preferably, the second corresponding relation is: if the integral coefficient is greater than or equal to a sixth set integral coefficient, the proportional coefficient is a second set proportional coefficient; if the coefficient is less than a sixth set integral coefficient, the proportional coefficient is a third set proportional coefficient, wherein the second set proportional coefficient is greater than the third set proportional coefficient.

In step 24, the third set rule employed in heating mode preferably includes:

If the real-time outdoor environment temperature is greater than the second set outdoor environment temperature and the real-time running frequency is less than the second set frequency, the integral coefficient is the third set basic integral coefficient;

If the real-time outdoor environment temperature is greater than the second set outdoor environment temperature and the real-time running frequency is greater than or equal to the second set frequency, the integral coefficient $k_i$=(f−the second set frequency)*1+the third set basic integral coefficient;

If the real-time outdoor environment temperature is equal to or less than the second set outdoor environment temperature and the real-time running frequency is less than the second set frequency, the integral coefficient is the fourth set basic integral coefficient;

If the real-time outdoor environment temperature is equal to or less than the second set outdoor environment temperature and the real-time running frequency is equal to or greater than the second set frequency, the integral coefficient $k_i$=(f−the second set frequency)*1+the fourth set basic integral coefficient;

wherein, the second set frequency and the first set frequency are same as above described, and f is the real-time running frequency.

Similarly, as the air conditioner working in the heating mode, further determination is performed by using the second set frequency which is less than the first set frequency, so as to form a frequency buffer range formed by the first set frequency and the second set frequency which is used to determine the real-time compressor running frequency. In the frequency buffer range, the integral coefficient is obtained from the linear relation $k_i$=(f−the second set frequency)*1+the third set basic integral coefficient or $k_i$=(f−the second set frequency)*1+the fourth set basic integral coefficient, which could avoid the fluctuation of the electronic expansion valve opening amount caused by a sudden change of the integral coefficient as the working state of the compressor converting from the low-frequency state to the non-low-frequency state.

Moreover, as described above, the integral coefficient of the PID algorithm acquired according to the first set rule in Step 24 is greater than or equal to the integral coefficient of the PID algorithm acquired according to the third set rule in Step 24. Therefore, both of the third set basic integral coefficient and the fourth set basic integral coefficient are less than the fifth set integral coefficient and the maximum of the integral coefficient calculated by the linear formulas $k_i$=(f−the second set frequency)*1+the third set basic integral coefficient or $k_i$=(f−the second set frequency)*1+the fourth set basic integral coefficient is the fifth set integral coefficient, that is to say the integral coefficient calculated by the linear formulas is not allowed to be greater than the fifth set integral coefficient. For example, if the integral coefficient $k_i$ calculated according to either of the above formulas is less than the fifth set integral coefficient, $k_i$ is assigned the calculated by the formula; and if the integral coefficient $k_i$ calculated according to either of the above formulas is greater than or equal to the fifth set integral coefficient, $k_i$ is assigned the fifth set integral coefficient.

In heating mode, after obtaining the integral coefficient in Step 24, assigning a vale into the differential coefficient variable of the PID algorithm in Step 25; there is no limit to the differential coefficient, it could be a fixed value. But the assignment of a proportional coefficient variable in the PID algorithm is preferable determined on the basis of the integral coefficient obtained. In order to improve the stability on the control of the electric expansion valve opening amount, as a preferred embodiment, procedures after obtaining the integral coefficient of the PID algorithm according to the third set rule in Step 24 further comprising: based on a third corresponding relation associating of available proportional coefficients to integral coefficients, obtaining a proportional coefficient paired with the integral coefficient of the PID algorithm acquired according to the third set rule. In this way, the proportional coefficient obtained in Step 25 is a value paired with the integral coefficient acquired according to the third set rule, which results from the third corresponding relation associating of proportional coefficient to the of integral coefficient. More preferably, the third corresponding relation is: if the integral coefficient is greater than or equal to the seventh set integral coefficient, the proportional coefficient is a fourth set proportional coefficient; if the integral coefficient is less than the seventh set integral coefficient, the proportional coefficient is a fifth set proportional coefficient, wherein the fourth set proportional coefficient is greater than the fifth set proportional coefficient.

In those preferred embodiments, as the first set basic integral coefficient, the second set basic integral coefficient, the third set basic integral coefficient, and the fourth set basic integral coefficient described above, the second set frequency, the fifth set integral coefficient, the sixth set integral coefficient, the seventh set integral coefficient, the first corresponding relation, the second corresponding relation, the third corresponding relation, the first set proportional coefficient, the second set proportional coefficient, the third set proportional coefficient, the fourth set proportional coefficient, and the fifth set proportional coefficient are also fixed and stored in advance in the air conditioner controller, and could also be modified by authorization. The preferred values are: the second set frequency is 25 Hz, the first set basic integral coefficient is 6, the second set basic integral coefficient is 3, and the third set basic integral coefficient is 6, the fourth set the basic integral coefficient is 3, the fifth set integral coefficient is 12, the sixth set integral coefficient is 6, the seventh set integral coefficient is 6, the first set proportional coefficient is 200, the second set proportional coefficient is 200, the third set proportional coefficient is 100, the fourth set proportional coefficient is 200, and the fifth set proportional coefficient is 100.

It will nevertheless be understood that no limitation of the scope of the invention is thereby intended. Any alternations and further modification in the described embodiments, and any further applications of the principles of the invention as described herein are contemplated as would normally occur to one skilled in the art to which the invention relates.

What we claimed is:

1. A control method for an electronic expansion valve in air conditioner comprising:

obtaining a current running frequency of compressor, a current exhaust temperature and a current outdoor environment temperature as the compressor running;

retrieving a target exhaust temperature according to the current running frequency in a preset relation in which each available target exhaust temperature is paired with a single current running frequency, wherein the target exhaust temperature retrieved being defined as a first target exhaust temperature;

defining a sum of the first target exhaust temperature and a set compensation temperature as a second target exhaust temperature, wherein the set compensation temperature is determined by the current outdoor environment temperature; and performing a PID control on opening amount of the electronic expansion valve based on a deviation that is a difference between the current exhaust temperature and the second target exhaust temperature.

2. The control method for the electronic expansion valve in air conditioner according to the claim 1, wherein the set compensation temperature is a compensation temperature depending on the current outdoor environment temperature retrieving from a set of available compensation temperatures with respect to current outdoor environment temperatures, which are stored for calling in advance.

3. The control method for the electronic expansion valve in air conditioner according to the claim 2, wherein the process for determining the set compensation temperature includes:

comparing the current outdoor environment temperature with boundaries of preset outdoor environment temperature ranges to determine an the one outdoor environment temperature range that the real timecurrent outdoor environment temperature belonging to;

retrieving the a compensation temperature according to the determined outdoor environment temperature range in the a-set of available compensation temperatures which are paired with the outdoor environment temperature ranges; and reading out the retrieved set of available compensation temperature which is being used as the set compensation temperature.

4. The control method for the electronic expansion valve in air conditioner according to the claim 3, after obtaining the second target exhaust temperature, which is the sum of the first target exhaust temperature and the set compensation temperature, further comprises:

determining whether or not the second target exhaust temperature is changed;

in response to the second target exhaust temperature is not changed, performing the PID control on opening amount of the electronic expansion valve based on a deviation that is a difference between the current exhaust temperature and the second target exhaust temperature;

in response to the second target exhaust temperature is changed, performing the PID control on opening amount of the electronic expansion valve based on a deviation that is a difference between the current exhaust temperature and the second target exhaust temperature and starting a timer as soon as the second target exhaust temperature is changed; restarting the timer as soon as the second target exhaust temperature is changed again; within a timing period in response to a measured time of the timer does not reach to a set time, maintaining the set compensation temperature unchanged; within a timing period since a measured time of the timer reaches to the set time until the restart of the timer, determining whether or not the current outdoor environment temperature is changed by comparing with the original outdoor environment temperature sampled as the timer starts; in response to the current outdoor environment temperature varies, refreshing the set compensation temperature according to the varied current outdoor environment temperature; in response to the current outdoor environment temperature remaining the same, maintaining the set compensation temperature unchanged.

5. The control method for the electronic expansion valve in air conditioner according to claim 1, after obtaining the current running frequency, the current exhaust temperature and the current outdoor environment temperature, before performing the PID control, further comprises:

comparing the current running frequency with a first set frequency;

in response to the current running frequency is greater than or equal to the first set frequency, obtaining an integral coefficient of the PID algorithm according to a first set rule;

in response to the current running frequency is less than the first set frequency, performing a process comprising:

in cooling mode:

comparing the current outdoor environment temperature with a first set outdoor environment temperature;

in response to the current outdoor environment temperature is less than the first set outdoor environment temperature, obtaining an integral coefficient of the PID algorithm according to a first set basic integral coefficient and a second set rule;

in response to the current outdoor environment temperature is greater than or equal to the first set outdoor environment temperature, obtaining an integral coefficient of the PID algorithm according to a second set basic integral coefficient and the second set rule;

wherein the integral coefficient of the PID algorithm obtained according to the first set rule is greater than or equal to the integral coefficient of the PID algorithm obtained according to the second set rule and the first set basic integral coefficient is greater than the second set basic integral coefficient;

in heating mode:

comparing the current outdoor environment temperature with a second set outdoor environment temperature;

in response to the current outdoor environment temperature is greater than the second set outdoor environment temperature, obtaining an integral coefficient of the PID algorithm according to a third set basic integral coefficient and a third set rule;

in response to the current outdoor environment temperature is less than or equal to the second set outdoor environment temperature, obtaining an integral coefficient of the PID algorithm according to a fourth set basic integral coefficient and a third set rule;

wherein the integral coefficient of the PID algorithm obtained according to the first set rule is greater than or equal to the integral coefficient of the PID obtained according to the third set rule and the third set basic integral coefficient is greater than the fourth set basic integral coefficient; and performing the PID control by means of the integral coefficient obtained by the first set rule, the second set rule or the third set rule.

6. The control method for the electronic expansion valve in air conditioner according to the claim 5, wherein the first set rule comprises:

the integral coefficient is a fifth set integral coefficient;

obtaining a integral coefficient according to the first set rule is to assign the fifth set integral coefficient to the integral coefficient variable of the PID algorithm.

7. The control method for the electronic expansion valve in air conditioner according to the claim 6, wherein after determining the integral coefficient of the PID algorithm according to the first set rule, further comprising:

determining a proportional coefficient with respect to the integral coefficient of the PID algorithm obtained by the first set rule by means of retrieving in a first corresponding relation in which integral coefficients are paired with available proportional coefficients ; and assigning the determined proportional coefficient to the proportional coefficient variable of the PID algorithm of the PID control, wherein the proportional coefficient of the PID algorithm depending on the integral coefficient obtained according to the first set rule and being retrieved from the first corresponding relation in which integral coefficients are paired with proportional coefficients.

8. The control method for the electronic expansion valve in air conditioner according to the claim 6, wherein the first corresponding relation comprises:

the integral coefficient is the fifth set integral coefficient and the proportional coefficient is a first set proportional coefficient.

9. The control method for the electronic expansion valve in air conditioner according to the claim 5, wherein the second set rule comprises:

in response to the current outdoor environment temperature is less than the first set outdoor environment temperature and the current running frequency is less than a second set frequency, the integral coefficient is the first set basic integral coefficient;

in response to the current outdoor environment temperature is less than the first set outdoor environment temperature and the current running frequency is greater than or equal to the second set frequency, the integral coefficient $k_i$, satisfies $k_i$=(f−the second set frequency)*2+the first set basic integral coefficient;

in response to the current outdoor environment temperature is greater than or equal to the first set outdoor environment temperature and the current running frequency is less than the second set frequency, the integral coefficient is the second set basic integral coefficient;

in response to the current outdoor environment temperature is greater than or equal to the first set outdoor environment temperature and the current running frequency is greater than or equal to the second set frequency, the integral coefficient $k_i$ satisfies $k_i$=(f−the second set frequency)*2+the second set basic integral coefficient;

the second set frequency is less than the first set frequency and f represents the current running frequency.

10. The control method for the electronic expansion valve in air conditioner according to the claim 9, wherein after determining the integral coefficient of the PID algorithm according to the second set rule, further comprising:

determining a proportional coefficient with respect to the integral coefficient of the PID algorithm obtained by the second set rule by means of retrieving in a second corresponding relation in which integral coefficients are paired with available proportional coefficients;

and assigning the determined proportional coefficient to the proportional coefficient variable of the PID algorithm of the PID control, wherein the proportional coefficient of the PID algorithm depending on the integral coefficient obtained according to the second set rule and being retrieved from the second corresponding relation in which integral coefficients are paired with proportional coefficients.

11. The control method for the electronic expansion valve in air conditioner according to the claim 10, wherein the second corresponding relation comprises:

in response to the integral coefficient is greater than or equal to a sixth set integral coefficient, the proportional coefficient is a second set proportional coefficient; in response to the integral coefficient is less than the sixth set integral coefficient, the proportional coefficient is a third set proportional coefficient, wherein the second set proportional coefficient is greater than the third set proportional coefficient.

12. The control method for the electronic expansion valve in air conditioner according to the claim 5, wherein the third set rule comprises:

in response to the current outdoor environment temperature is greater than the second set outdoor environment temperature and the current running frequency is less than the second set frequency, the integral coefficient is the third set basic integral coefficient;

in response to the current outdoor environment temperature is greater than the second set outdoor environment temperature and the current running frequency is greater than or equal to the second set frequency, the integral coefficient $k_i$, satisfies $k_i$=(f−the second set frequency)*1+the third set basic integral coefficient;

in response to the current outdoor environment temperature is less than or equal to the second set outdoor environment temperature and the current running frequency is less than the second set frequency, the integral coefficient is the fourth set basic integral coefficient;

in response to the current outdoor environment temperature is less than or equal to the second set outdoor environment temperature and the current running frequency is greater than or equal to the second set frequency, the integral coefficient $k_i$ satisfies $k_i$=(f−the second set frequency)*1+the fourth set basic integral coefficient;

wherein the second set frequency is less than the first set frequency and f represents the current running frequency.

13. The control method for the electronic expansion valve in air conditioner according to the claim 12, wherein after determining the integral coefficient of the PID algorithm according to the third set rule, further comprising:

determining a proportional coefficient with respect to the integral coefficient of the PID algorithm obtained by the third set rule by means of retrieving in a third corresponding relation in which integral coefficients are paired with available proportional coefficients; and assigning the determined proportional coefficient to the proportional coefficient variable of the PID algorithm of the PID control, wherein the proportional coefficient of the PID algorithm depending on the integral coefficient obtained according to the third set rule and being retrieved from the third corresponding relation in which integral coefficients are paired with proportional coefficients.

14. The control method for the electronic expansion valve in air conditioner according to the claim 13, wherein the third corresponding relation comprises:

in response to the integral coefficient is greater than or equal to a seventh set integral coefficient, the proportional coefficient is a fourth set proportional coefficient; in response to the integral coefficient is less than the seventh set integral coefficient, the proportional coefficient is a fifth set proportional coefficient, wherein the fourth set proportional coefficient is greater than the fifth set proportional coefficient.

* * * * *